United States Patent [19]

Stearns et al.

[11] Patent Number: 4,724,117
[45] Date of Patent: Feb. 9, 1988

[54] POLARIZATION OF FAST PARTICLE BEAMS BY COLLISIONAL PUMPING

[75] Inventors: J. Warren Stearns, Castro Valley; Selig N. Kaplan, El Cerrito; Robert V. Pyle, Berkeley, all of Calif.; L. Wilmer Anderson, Madison, Wis.; Lawrence Ruby, Berkeley; Alfred S. Schlachter, Oakland, both of Calif.

[73] Assignee: The United States of America as represented by the United States Department of Energy, Washington, D.C.

[21] Appl. No.: 662,655

[22] Filed: Oct. 19, 1984

[51] Int. Cl.$^4$ .......................... G21B 1/02; H01J 17/26
[52] U.S. Cl. .................................... 376/129; 376/108; 376/127; 250/423 R; 313/231.31; 313/362.1; 315/111.81
[58] Field of Search ................ 376/108, 111, 114, 127, 376/129; 328/233; 315/111.81; 313/362.1, 231.31; 250/423 R

[56] References Cited

U.S. PATENT DOCUMENTS

| | | |
|---|---|---|
| 3,286,162 | 11/1966 | Abragam et al. |
| 3,390,293 | 6/1968 | Nunan . |
| 3,617,789 | 11/1971 | Middleton et al. .................... 313/63 |
| 4,293,794 | 10/1981 | Kapetanakos . |
| 4,298,798 | 11/1981 | Huffman . |
| 4,314,180 | 2/1982 | Sulisbury . |
| 4,548,782 | 10/1985 | Manheimer et al. ................ 376/127 |
| 4,642,206 | 2/1987 | Honig .................................. 376/127 |
| 4,661,710 | 4/1987 | Verney et al. .................. 250/423 R |

OTHER PUBLICATIONS

Knize et al., "Optical Pumping Production of Spin Polarized Hydrogen for Fusion Applications", Mar. 26–27, 1984.
Micklich et al., "Nuclear Technology/Fusion", vol. 5, Mar. 1984, pp. 162–168.
Sona, "Energla Nucleare", vol. 14, N. 5, Maggio, 1967, pp. 295–299.
Mori et al., "Optically Pumped Polarized H$^-$ Ion Source at KEK", pp. 259–268.
Anderson et al., "Physical Review Letters", vol. 52, No. 8, Feb. 20, 1984, pp. 609–612.
Anderson et al., "Polarization of Fast Atomic Beams by Collisional Pumping", 9/16/83.
Anderson, "Nuclear Instruments and Methods" 167, 1979, pp. 363–370.
Anderson et al., "Spin-Dependent Charge Transfer in a Polarized Target," 10/26/83.
Anderson et al., "J. Phys. B.: At. Mol. Phys." 17 (1984), pp. 229–233.
Gruebler, "Review of the Ground State Atomic Beam Stage of Polarized Hydrogen Ion Sources", May 20–27, 1981.
Schlachter et al., "Physical Review A", vol. 22, No. 6, Dec. 1980, pp. 2494–2509.
Berkner et al., "Proceedings of the 8th Symposium on Engineering Problems of Fusion Research," vol. 1, 1979, pp. 214–216.
Kleppner, "AIP Conference Proceedings", No. 111, 1984, pp. 720–733.
Cornelius et al., "Physical Review Letters", vol. 49, No. 12, 7/20/82, pp. 870–873.
"Nuclear Technology/Fusion, vol. 2", Jul. 1982, Hooper, Jr. et al., pp. 362–371.
Kulsrud et al., "Fusion Reactor Plasmas with Polarized Nuclei II", Sep. 1982, pp. 1–11.
Knize et al., "Optical Pumping Production of Spin Polarized Hydrogen", Sep. 1984, pp. 1–15.

Primary Examiner—Richard D. Lovering
Assistant Examiner—Eric Jorgensen
Attorney, Agent, or Firm—Clifton E. Clouse, Jr.; Roger S. Gaither; Judson R. Hightower

[57] ABSTRACT

Method and apparatus for highly polarizing a fast beam of particles by collisional pumping, including generating a fast beam of particles, and also generating a thick electron-spin-polarized medium positioned as a target for the beam. The target is made sufficiently thick to allow the beam to interact with the medium to produce collisional pumping whereby the beam becomes highly polarized.

17 Claims, 8 Drawing Figures

POLARIZATION OF FAST PARTICLE BEAMS BY COLLISIONAL PUMPING

BACKGROUND OF THE INVENTION

The invention disclosed herein was made under, or in, the course of United States Department of Energy Contract No. DE-AC03-76SF00098.

The present invention relates to method and apparatus for polarizing a particle beam, and more particularly, it relates to "collisional pumping" whereby there is a succession of charge-changing collisions and electron-nuclear spin mixing between a high-current particle beam and a thick electron-spin-polarized target to produce polarization of the particle beam.

Polarized particle beams, in particular beams of polarized ions, are useful in connection with nuclear-reaction studies. However, a major use of polarized particle beams is anticipated to be in the heating and fueling of fusion reactors. It has been shown that polarized reacting particles injected into a fusion reactor can be used to favorably modify the reaction rates and the angular distribution of reaction products. It is advantageous that such fueling is accomplished by injection of multiampere (equivalent) beams of nuclear-polarized atoms into the reactor.

Polarized hydrogen atoms have been produced before by capture of a single spin-polarized electron by a proton directed through an electron-spin-polarized target in a high magnetic field. However, the highest current that has been produced by use of any process is only around 100 $\mu$A, far below the current required to fuel a fusion reactor.

SUMMARY OF THE INVENTION

In brief, the invention relates to method and apparatus for polarizing a fast beam of particles by collisional pumping, including generating a fast beam of particles, and generating a thick electron-spin-polarized medium positioned as a target for said beam, said medium being sufficiently thick to allow said beam to interact with said medium to produce collisional pumping whereby said particle beam becomes highly polarized.

It is an object of the invention to produce high-current particle beams that are highly polarized.

Another object is to polarize a high-current particle beam to nearly 100%.

Another object is to polarize a high-energy high-current ionized beam of particles of hydrogen, deuterium, tritium and/or other nuclei.

Another object is to polarize a low-energy high-current particle beam.

Another object is to polarize a high-current particle beam efficiently, simply and with mimimal cost.

Another object is to produce a highly polarized ampere-current particle beam.

Other objects and advantageous features of the invention will be apparent in a description of a specific embodiment thereof, given by way of example only, to enable one skilled in the art to readily practice the invention which is described hereinafter with reference to the accompanying drawing.

DETAILED DESCRIPTION OF THE INVENTION

Reference will now be made in detail to the preferred embodiments of the invention, examples of which are illustrated in the accompanying drawing.

While the invention will be described in connection with the preferred embodiments, it will be understood that it is not intended to limit the invention to those embodiments. On the contrary, it is intended to cover all alternatives, modifications and equivalents as may be included within the spirit and scope of the invention defined in the appended claims.

Figure 1:
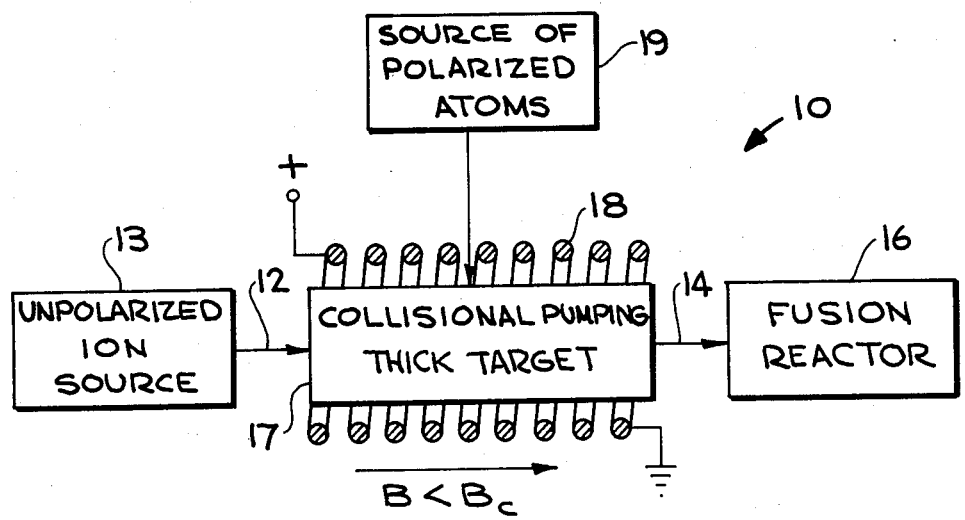
FIG. 1 is a block diagram of a system for converting an unpolarized ion beam, by collisional pumping within a thick target in a low magnetic field, to a highly nuclear-spin-polarized beam, according to the invention.

Referring to the drawings, there is shown in FIG. 1 a system 10 for converting a beam 12 of unpolarized ions such as hydrogen from a source 13 to a high-current neutral beam output 14 of highly polarized particles suitable for fueling a fusion reactor 16. The source 13 may be of the type described by Berkner et al in "Development of 120 keV Neutral Beam Injectors", *Proceedings of the 8th Symposium on Engineering Problems of Fusion Research*, IEEE Pub. No. 79 CH1441-5 NPS, 1979, pages 214–216, and which is hereby incorporated by reference. The conversion of the unpolarized ions to a polarized neutral beam is accomplished by means of collisional pumping, according to the invention. Collisional pumping is performed within a thick target 17 which is continuously supplied and replenished with electron-spin polarized atoms such as hydrogen from a source 19 which may be a cryogenic source or a spin-exchange source. A suitable source 19 would be the one described by Kleppner in "Optics For A Spin-Polarized Hydrogen Atomic Beam", *Production and Neutralization of Negative Ions and Beams,* American Institute of Physics, 1984, pages 720–733, and which is hereby incorporated by reference.

A dc magnetic field B is established throughout the target by means of a coil 18 to stabilize and retain the spin orientation of the target. The field B is less than the critical field $B_c$ which is the external field that is equal to the nuclear magnetic field. The ratio $B/B_c$ should be on the order of unity or smaller. The beam 12 is directed to the target 17 and as the beam traverses the target there are repeated charge-changing collisions of the initially unpolarized ions of the beam with the electron-spin-polarized atoms of the target. The unpolarized ions thereby acquire spin-polarized electrons which permits interaction of the spin of the electrons with the nuclear spin of the ions. This interaction results in re-orientation of the nuclear spin. Repeated additional collisions of the ions with other polarized target atoms further orients the nuclear spin of the ions to be that of the acquired target electrons. This process is termed collisional pumping whereby repeated charge-changing collisions combine with electron-nuclear spin mixing between collisions to pump the entire beam to a high state of nuclear polarization. Subsequent electron-loss collisions do not affect the nuclear spin. The beam 12 thereby is collisionally pumped to produce the highly polarized neutral beam 14.

Collisional pumping, according to the invention, requires that the magnetic field $\vec{B}$ be low so that electron spin $\vec{J}$ and and nuclear spin $\vec{I}$ in the ground level of the hydrogen atom are coupled together by the hyperfine interaction to form total angular momentum $\vec{F}=\vec{J}+\vec{I}$. Therefore F and $m_F$ (the eigenvalue of the projection of $\vec{F}$ along the magnetic field direction) are good quantum numbers. This requires a field B less than the critical field $B_c$ (hyperfine energy splitting divided by the Bohr magneton), which is 507 G for H, 117 G for D, and 541 G for T.

Consider a beam of unpolarized protons incident on a thick polarized hydrogen target. Following capture of a polarized electron by a fast ion, the hyperfine interaction transfers some of the electron-spin polarization into nuclear-spin polarization. This occurs as follows: When the proton spin is parallel to the spin of the captured electron, the nuclear spin is unaffected; but when the proton spin is antiparallel to the spin of the captured electron, the hyperfine interaction causes both the electron and nuclear spins to oscillate while maintaining an $m_F$ of zero. The combination of these effects leads to a net nuclear-spin polarization of 0.5, provided that the collision frequency is less than the hyperfine frequency. A subsequent electron-loss collision does not affect the nuclear spin. Subsequent capture of a polarized electron in the target further increases the nuclear polarization of the beam. Thus a succession of electron-capture and electron-loss collisions "pumps" both the electron-spin and the nuclear-spin polarization of the fast beam nearly up to the electron-spin polarization of the target. If the target electron-spin polarization is 1, and we ignore the small negative-ion fraction and possible depolarization mechanisms, we can describe the fast-hydrogen beam in a low magnetic field ($B \ll B_c$) with the following equations:

$$dH_{\frac{1}{2}}^+/d\pi = -\sigma_{+o}H_{\frac{1}{2}}^+ + \sigma_{o+}(H_{11}^o + \frac{1}{2}H_{10}^{o} + \frac{1}{2}H_{oo}^o),$$

$$dH_{-\frac{1}{2}}^+/d\pi = -\sigma_{+o}H_{-\frac{1}{2}}^+ + \sigma_{o+}(H_{1-1}^o + \frac{1}{2}H_{10}^o + \frac{1}{2}H_{oo}^o),$$

$$dH_{-11}^o/d\pi = -\sigma_{o+}H_{11}^o + \sigma_{+o}H_{\frac{1}{2}}^+,$$

$$dH_{10}^o/d\pi = -\sigma_o H_{10}^o + \frac{1}{2}\sigma_{+o}H_{-\frac{1}{2}}^+,$$

$$dH_{1-1}^o/d\pi = -\sigma_{o+}H_{1-1}^o,$$

$$dH_{oo}^o/d\pi = -\sigma_{o+}H_{oo}^o + \frac{1}{2}\sigma_{+o}H_{-\frac{1}{2}}^+,$$

where $\sigma_{+o}$ and $\sigma_{o+}$ are electron-capture and electron-loss cross sections; $H_{\frac{1}{2}}^+$ and $H_{\frac{1}{2}}^-$ are fractional populations of spin-up and spin-down protons; $H_{Fm_F}$ are fractional populations of the atoms in low-field $Fm_F$ atomic eigenstates; and $\pi$ is target thickness.

Atomic charge-transfer cross sections are the same for H, D, or T at the same velocity. Tritium is described by the same equations as hydrogen since it also has a nuclear spin of $\frac{1}{2}$. However, because D has a nuclear spin of 1, a comparable description requires nine differential equations, and nuclear polarization is described by two parameters: vector polarization $P_z=N_+ - N_{31}$, and tensor polarization $P_{zz}=1-3N_o$, where $N_+$, $N_o$, and $N_-$ are the relative populations of the three nuclear-spin states. Electron and therefore nuclear depolarization occurs via radiation from the decay of $n=2$ or higher atomic levels produced in the electron capture. Using measured electron-capture cross sections into $n=2$ and higher levels, atomic depolarization should be about 4%, which causes a reduction in nuclear polarization of about 8% for H (or T) and 12% for D.

Figure 2:
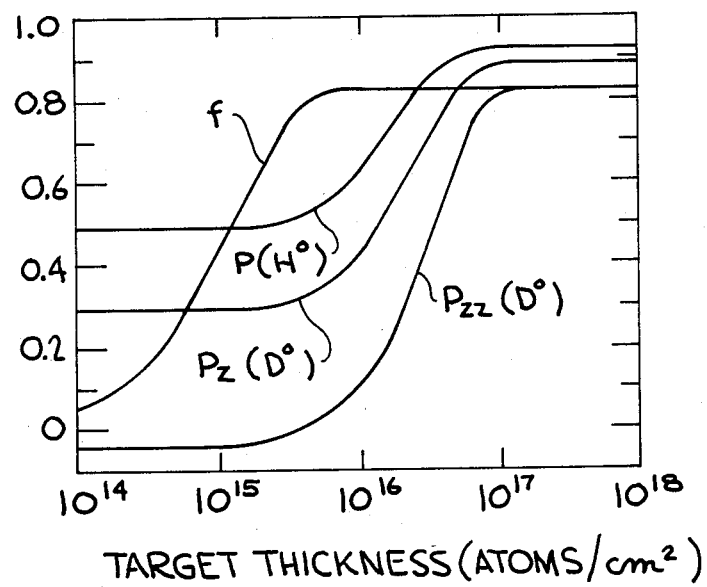
FIG. 2 is a set of curves showing the neutral fraction of the highly nuclear-spin-polarized beam of FIG. 1 as a function of target thickness, along with the nuclear polarizations, all for 20 keV/u unpolarized $H^+$, $T^+$ or $D^+$ incident on the target in a low magnetic field, as related to the system of FIG. 1.

In FIG. 2 there is shown the expected neutral fraction (f) of the output beam 14, along with the nuclear polarization of the beam 14, both as a function of target thickness, for 20 keV/u unpolarized $H^+$, $T^+$ or $D^+$ incident on the polarized target 17 in a low magnetic field $B \ll B_c$. Target polarization $P_t$ is taken as 1; if $P_t$ is less than 1, the final nuclear polarization of the fast beam is reduced by the factor $P_t$.

It should be noted in FIG. 2 that at a target density of $10^{17}$ atoms/cm² or more there is a maximum polarization of the initially unpolarized ions incident on the target. Conversely, for any density greater than $10^{17}$ atoms/cm², the polarization is not increased, while scattering of output beam 14 would increase due to the denser target, without any further benefit.

The beam 14 emerging at the output of the target 17 is highly polarized, it is primarily neutral and it can be in the ampere range suitable for fueling the fusion reactor 16. With a nearly 100% polarized target and a source beam from 5–150 keV, the efficiency of the system 10 in producing an output beam should be as follows:

Polarization 80–95%
Transmission ~100% at higher energies (~50 keV/u, depending on apertures, target length and magnetic fields)
Ion Fraction ~90% at high energies (~150 keV/u)
Neutral Fraction ~90% at low energies (< or ≅10 keV/u)

Figure 3:
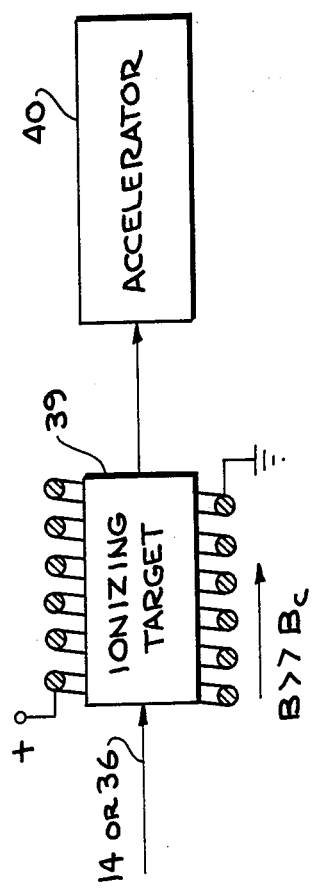
FIG. 3 is a block diagram of a target for ionizing the polarized neutral beams produced in the systems of FIG. 1.

The nuclear-polarized high-energy neutral beam 14 is also useful in accelerators and can be partially converted into a nuclear polarized ion beam for such use. This may be done by ionizing the beam 14 in a target 39 (FIG. 3) for injection into an accelerator 40. The target 39 need not be polarized. It should, however, be in a magnetic field B that is large compared to the critical field $B_c$, in order that $\vec{J}$ and $\vec{I}$ in the ground level of H are decoupled, so that there is no nuclear depolarization due to the hyperfine interaction as the beam passes through the target. At high energies the ion fraction of the beam emerging from the target can be accelerated directly.

Spin-polarized target thickness required for production of a high energy polarized H beam by collisional pumping is about $10^{17}/cm^2$. The rate at which target particles must be produced depends on the incident beam current. Each projectile in the beam being polarized makes ten to thirty charge-changing collisions as it passes through a polarized hydrogen target; the production rate of electron-spin-polarized target atoms must be comparable, i.e., 10 to 30 times the number of beams particles per second. This requires a production rate of $10^{20}$–$10<$polarized target atoms per second to produce a one-ampere polarized beam.

Figure 4:
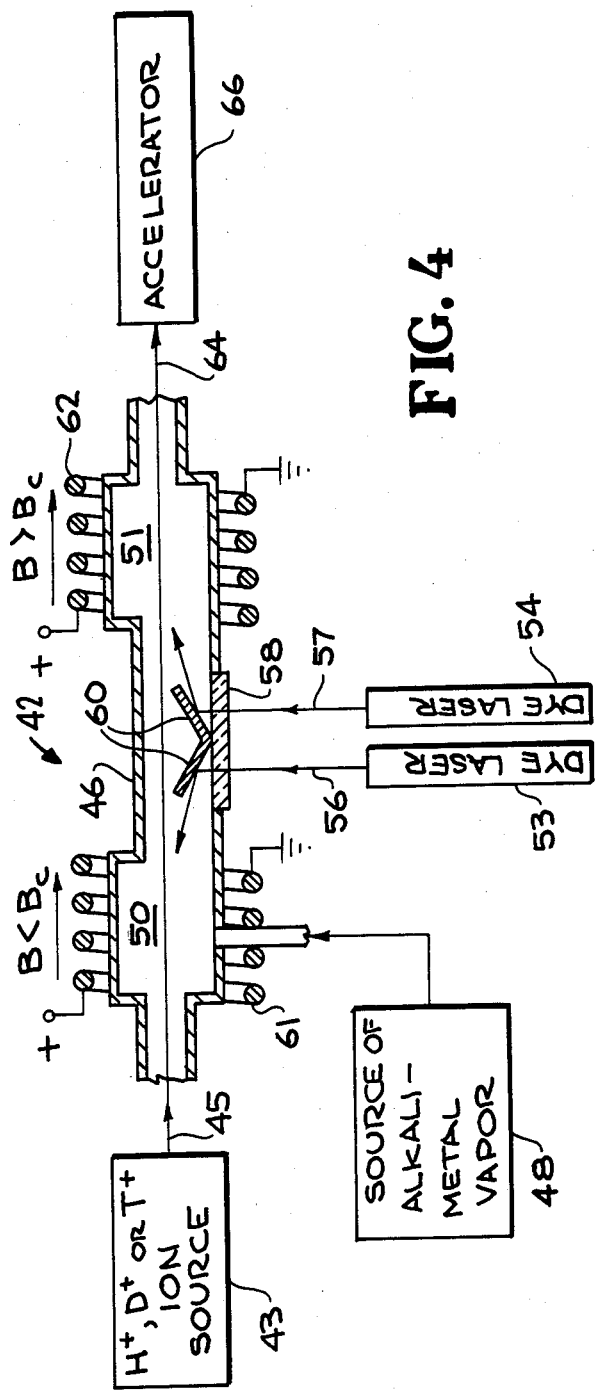
FIG. 4 is a schematic diagram of a system for converting an ion beam by collisional pumping in an alkali-metal-vapor target to a highly polarized beam, according to the invention.

Another arrangement for producing a highly polarized beam of particles, according to the invention, is shown in FIG. 4 as a system 42. The system 42 includes an ion source 43 for generating a beam 45 of $H^+$, $D^+$ or $T^+$ ions for injection into a target 46. The target 46 is filled with an alkali-metal vapor such as Cs, Na ... from a vapor source 48. Such vapors are characterized by having one loosely bound electron outside the atomic core. The target 46 is comprised of a collisional-pumping chamber 50 and an ionization chamber 51. The metal vapor in the chambers 50 and 51 is electron-spin polarized by means such as dye lasers 53 and 54 respectively. The lasers generate beams 56 and 57 which are directed through a window 58 into the target 46 to reflect from mirrors 60 into the respective chambers 50 and 51 for polarizing the vapor in each chamber by laser optical pumping. The circular polarization and tuning of lasers 53 and 54 may be adjusted to electron-spin polarize the vapor in cell 50 to be in the opposite sense to the vapor in cell 51. Such adjustment may be accomplished in the manner set forth by Cornelius et al in "Optical Pumping of Dense Charge-Exchange Targets for Polarized Ion Sources", *Physical Review Letters*, Vol. 49, No. 12, Sept. 20, 1982, and which hereby is incorporated by reference. The direction of polarization of the cell 50 is oriented to be along the beam axis by a magnetic field $B<Bc$ that is established throughout the chamber 50 by means of a coil 61, while the direction of polarization of the cell 51 is oriented, also to be along the beam axis but 180° opposite to that in cell 50, by a magnetic field $B<Bc$ that is established throughout the chamber 41 by means of a coil 62.

As the unpolarized $H^+$, $D^+$ or $T^+$ ion beam traverses the target 46, it first is directed through the chamber 50 where the unpolarized $H^+$, $D^+$ or $T^+$ ions are neutralized by charge-changing collisons of the initially unpolarized ions of the beam with the electron-spin-polarized atoms in the target chamber 50. The unpolarized $H^+$, $D^+$ or $T^+$ ions thereby acquire electrons with spin which permits mixing of the electron spin with the nuclear spin of the ions. Repeated additional collisions of the ions with other polarized target atoms further orients the nuclear spin of the ions to be that of the acquired target electrons. The beam 45 is thereby collisionally pumped to produce a highly polarized neutral beam.

As the beam 45, which is now comprised primarily of polarized neutral $H^o$, $D^o$ or $T^o$ atoms, continues through the target 46, it is directed into the chamber 51 in which the alkali atoms are polarized in a state opposite to that in chamber 50. As the polarized neutral atoms interact with the oppositely polarized alkali atoms, they capture electrons of oppositely directed spin to form $H^-$ ions. (The $H^-$ ion exists only in a $1s^2$ state where the electrons have oppositely directed spins.) The $H^-$ ions emerge from the chamber 51 as a negative beam 64 that is suitable for use such as acceleration in an accelerator 66. The invention will also produce polarized ions when the target in the second chamber 51 is unpolarized.

As an example of the system 42, the source 43 may be a low-energy $H^+$ beam 45 of approximately 1 keV directed at the pumping chamber 50 which is filled with cesium vapor from the source 48. For a beam of this energy, the thickness of the cesium vapor should be about $1 \times 10^{16}$ atoms/cm$^2$ to maximize the yield of $H^-$ ions in the beam 64. With a nearly 100% polarized target, the efficiency of the system 42 should be as follows to net an output beam that is 2–35% of the source beam and nearly 100% polarized:

Neutralization: ~100%
Ionization: 40–50%
Beam Transmission: 5–90%, depending on target geometry
Polarization: ~100%

Figure 6:
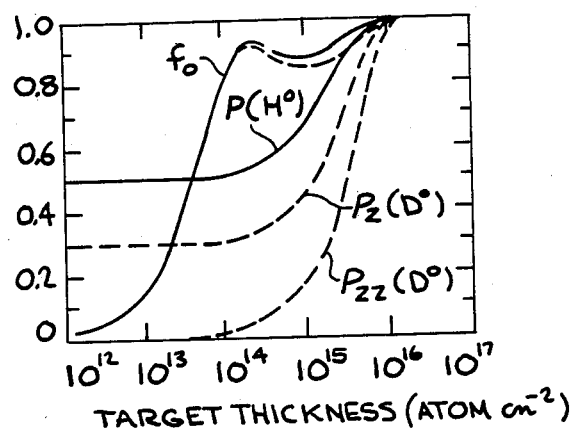
FIG. 6 is a set of curves showing the polarization and neutral fraction for a 400 eVu$^{-1}$ $H^+$ beam (full curves) and $D^+$ bean (broken curves) as a function of polarized cesium-vapor target thickness, as related to the system of FIG. 4, and assuming 100% of the electron-spin polarization is retained after electron capture by the $H^+$ or $D^+$.
Figure 7:
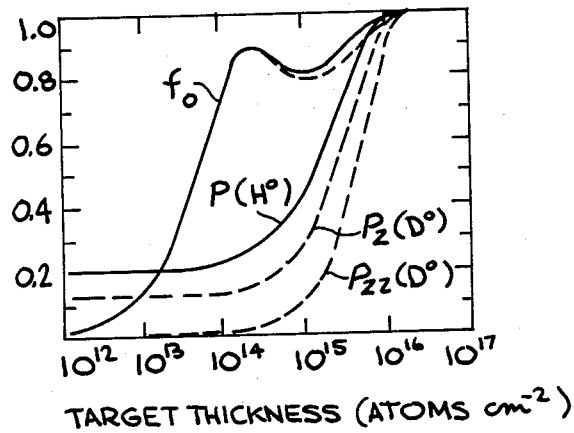
FIG. 7 is a set of curves similar to those of FIG. 6, also as related to the system of FIG. 4, but assuming 41% of the electron-spin polarization is retained after electron capture by the $H^+$ or $D^+$.
Figure 8:
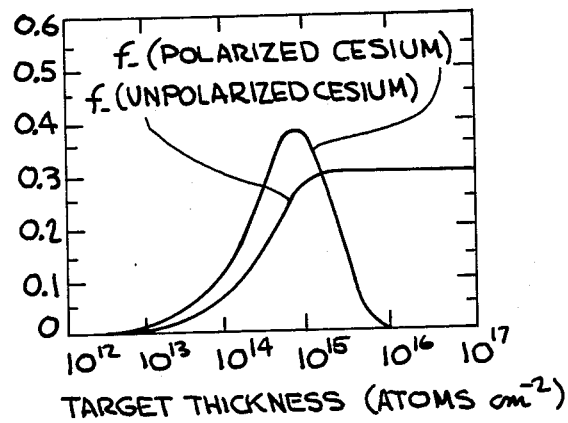
FIG. 8 is a set of curves showing the negative-ion fraction as a function of target thickness for a 400 eVu$^{-1}$ neutral hydrogen beam incident on a cesium-vapor target, as related to the system of FIG. 4.

In FIGS. 6 and 7 is shown the polarization and neutral fraction for 900 eV/u $H^+$ and $D^+$ as a function of polarized cesium-vapor target thickness. FIG. 6 is calculated assuming 100% of electron-spin polarization is retained after electron capture by $H^+$ or $D^+$, while FIG. 7 is calculated assuming 41% of electron-spin polarization is retained after electron capture by $H^+$ or $D^+$. FIG. 8 shows the $H^-$ fraction emerging from a polarized and an unpolarized cesium vapor target for 400 eV/u polarized $H^o$ incident. The polarization of the second target (chamber 51 in FIG. 4) is directed opposite to the polarization in the first target (chamber 50 in FIG. 4) so as to enhance the polarized $H^-$ yield.

One method for producing a thick optically pumped alkali target 50 is to optically pump a mixture of alkali vapors, one being an optically thin trace and the other being optically thick. In this method, the pumping radiation from the laser 53 corresponds to the alkali constituent that is optically thin, i.e. a photon means free path greater than the target length. The polarization of the thin trace constituent is then transferred to the thick constituent by spin exchange.

An example of such a mixture is a target that is comprised of Na or K at $10^{13}$ atoms/cm$^3$ as the minor constituent, with Cs or Rb at $10^{16}$ atoms/cm$^3$ as the major constituent. The laser is adjusted to pump the minor constituent which then polarizes the major constituent by spin exchange. Such an arrangement allows laser beams of practical photon energies and intensities to be used to pump a thick target of Cs or Rb, for cases where Cs and Rb are more effective targets for collisional pumping.

Figure 5:
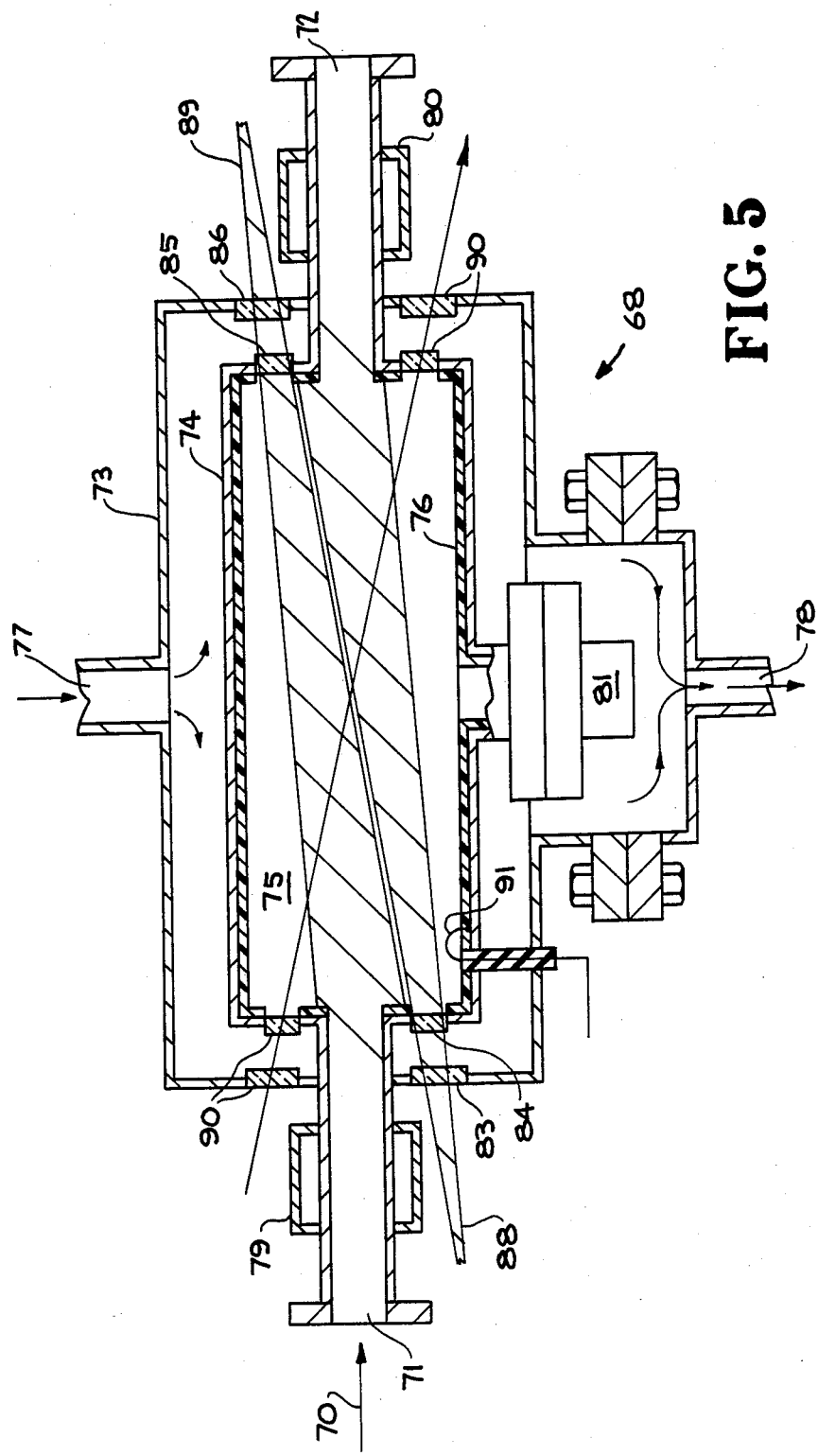
FIG. 5 is a cross-sectional view of a practical alkali vapor cell suitable for use in the system of FIG. 4.

A more specific embodiment of the chambers 50 and 51 (FIG. 4) is shown in FIG. 5 as a cell 68. The cell 68 may be used in place of either of the chambers 50 or 51. The cell 68 is arranged to accept a particle beam along a beam line 70 centered on input and output apertures 71 and 72 which connect to a central chamber 75. The cell 68 comprises an outer wall 73 and an inner wall 74 spaced from the outer wall. The inner wall includes an organic liner 76 such as one of the VITON ® Copolymers which are copolymers of vinylidene fluoride and hexafluoro-propylene, to reduce depolarization at wall collisions. The outer wall is provided with an inlet 77 and outlet 78 for passage of heating oil throughout the space between the inner and outer walls. Cooling oil is circulated around the input and output apertures 71 and 72 through cooling jackets 79 and 80. Alkali-metal vapor, such as cesium or a mixture of Cs and Na, is supplied to the chamber 75 from a source 81 which is positioned to be heated by the oil flowing between the inner and outer walls. Windows 83 and 84 are mounted in the walls 73 and 74 to admit a beam of circularly polarized laser light 88 for polarizing the vapor in the chamber 75. Windows 85 and 86 are provided in the walls of the opposite end of the cell 68 to admit a second beam 89 of circularly polarized laser light for more thoroughly polarizing the vapor. Additional windows 90 may be provided in the walls to permit passage of diagnostic laser beam probe through the chamber for measurement of polarization of the vapor in the chamber 75 by faraday rotation. An additional diagnostic measurement may be provided by an R.F. probe 91 fed through the walls 73 and 74 to the interior of the chamber 75. As with the chamber 50 and 51 (FIG. 4), the cell 68 is operated within a uniform magnetic field that extends throughout the chamber 75.

Additional theoretical details of the invention may be found in the following two publications which are hereby incorporated by reference:

1. Anderson et al, "Polarization of Fast Atomic Beams by 'Collisional Pumping': A Proposal for Production of Intense Polarized Beams", *Physical Review Letters*, Vol. 52, No. 8, Feb. 20, 1984, pages 609–612.

2. Anderson et al, "Spin-dependent charge transfer in a polarized target", *J. Phys. B: At. Mol. Phys.* 17, 1984, pages L229–L233.

While embodiments of the invention have been shown and described, further embodiments or combinations of those described herein will be apparent to those skilled in the art without departing from the spirit of the invention.

We claim:

1. A method for polarizng a fast beam of particles by collisional pumping, comprising the steps of:
   generating a beam of unpolarized ions; and
   generating an electron-spin-polarized medium of atoms positioned as a target for said beam, said target medium being sufficiently thick to allow said beam to interact with said medium to produce collisional pumping by repeated charge-changing collisions of the initially unpolarized ions of the beam with the electron-spin-polaized atoms of the target to produce a succession of electron-capture and electron-loss collisions to pump both the electron-spin and nuclear-spin polarization of the beam up to substantially the electron-spin polarization of the target.

2. The method of claim 1, wherein said particle beam is an unpolarized beam of hydrogen, deuterium or tritium, or other atomic specie which may be polarized by collisional pumping, said beam having an energy of 5 keV or greater and having a current of at least one ampere.

3. The method of claim 1, wherein said target is a polarized hydrogen target.

4. The method of claim 1, wherein said beam is a low-energy beam of approximately 1 keV of ionized hydrogen and said target is an electron-spin-polarized alkali-vapor target.

5. The method of claim 1, further including the step of applying a low magnetic field to said target, said field being less than the critical field of the ions.

6. The method of claim 1, wherein said particle beam is neutral, positively charged or negatively charged.

7. The method of claim 1, wherein said target has a density of electron-spin-polarized target atoms such that the length of the target is about 10 to 30 times the combined electron-capture-and-loss mean-free-paths of the beam particles.

8. An apparatus for polarizing a fast beam of particles by collisional pumping, including:
   means for generating a beam of particles;
   an electron-spin-polarized medium of atoms positioned as a target for said beam, said target being sufficiently thick to allow the particles of said beam to interact with said medium to produce collisional pumping by repeated charge-changing collisons of the initially unpolarized ions of the beam with the electron-spin-polarized atoms of the target to produce a succession of electron-capture and electron-loss collisions to pump both the electron-spin and nuclear-spin polarization of the beam up to substantially the electron-spin polarization of the target, said target having a thickness of at least $10^{16}$ atoms/cm$^2$.

9. The apparatus of claim 8, wherein said target is comprised of alkali-metal vapor.

10. The apparatus of claim 9, wherein said target is comprised of a mixture of two alkali-metal vapors, one being a minor constituent and the other being a major constituent, and further including means for polarizing the minor constituent, the major constituent being polarized by spin exchange with the minor constituent.

11. The apparatus of claim 10, wherein the minor constituent is Na or K at $10^{13}$ atoms/cm$^2$ and Cs or Rb is the major constituent at $10^{16}$ atoms/cm$^3$.

12. The apparatus of claim 8, further including means for establishing a magnetic field throughout said target.

13. The apparatus of claim 12, wherein said field is less than the critical field $B_c$.

14. The apparatus of claim 8, wherein said target thickness is around $10^{17}$ atoms/cm$^2$.

15. The apparatus of claim 8, further including a fusion reactor, said reactor being heated and/or fueled by the polarized particle beam emanating from said target.

16. The apparatus of claim 8, wherein said beam is a high-current beam in the one-ampere or more range.

17. The apparatus of claim 8, further including a second polarized target to produce negative ions, the polarization of the second target being directed opposite to the direction of said first mentioned target, and wherein said polarized beam is directed to pass through said second target to provide enhanced electron attachment to the polarized atoms.

* * * * *